US00RE44508E

(19) United States
(12) Reissued Patent
Ripoll et al.

(10) Patent Number: US RE44,508 E
(45) Date of Reissued Patent: Sep. 24, 2013

(54) PRODUCTION OF CAPSULES AND PARTICLES FOR IMPROVEMENT OF FOOD PRODUCTS

(75) Inventors: Antonio Barrero Ripoll, Sevilla (ES); Alfonso M Ganan-Calvo, Sevilla (ES); Ignacio Gonzalez Loscertales, Malaga (ES); Raul Cortijo Bon, Malaga (ES); Manuel Marquez, Lincolnshire, IL (US)

(73) Assignee: Kraft Foods Group Brands LLC, Northfield, IL (US)

(21) Appl. No.: 13/406,180

(22) Filed: Feb. 27, 2012

Related U.S. Patent Documents

Reissue of:
(64) Patent No.: 6,989,169
Issued: Jun. 24, 2006
Appl. No.: 10/627,387
Filed: Jul. 25, 2003

U.S. Applications:
(63) Continuation of application No. PCT/US02/02787, filed on Jan. 30, 2002.

(30) Foreign Application Priority Data

Jan. 31, 2001 (ES) ..... 200100231

(51) Int. Cl.
*A23P 1/04* (2006.01)

(52) U.S. Cl.
USPC ..... 426/235; 426/72; 426/74; 426/276; 425/5

(58) Field of Classification Search
USPC ..... 426/235, 276, 277, 72, 74, 89; 425/5
See application file for complete search history.

(56) References Cited

U.S. PATENT DOCUMENTS 4,251,195 A * 2/1981 Suzuki et al. ..... 425/6
4,251,547 A * 2/1981 Liggett ..... 426/1
6,248,378 B1 * 6/2001 Ganan-Calvo ..... 426/89

* cited by examiner

*Primary Examiner* — Drew E Becker
(74) *Attorney, Agent, or Firm* — Fitch, Even, Tabin & Flannery LLP

(57) ABSTRACT

The present invention is related to the production of capsules or particles of micro and nanometric size, for introduction into food, using stable electrified coaxial jets of two immiscible liquids with diameters in the micro and nanometric range. An aerosol of charged structured droplets forms when the jets dissociate by capillary instabilities. The structured droplets, which are mano-dispersed in size, contain a first liquid (generally the material desired to be added) that is surrounded by a second liquid. Generally the second liquid provides a barrier or protective coating which allows the addition of the first liquid to a food product without adversely affecting the organoleptic or other properties of the food product.

6 Claims, 1 Drawing Sheet

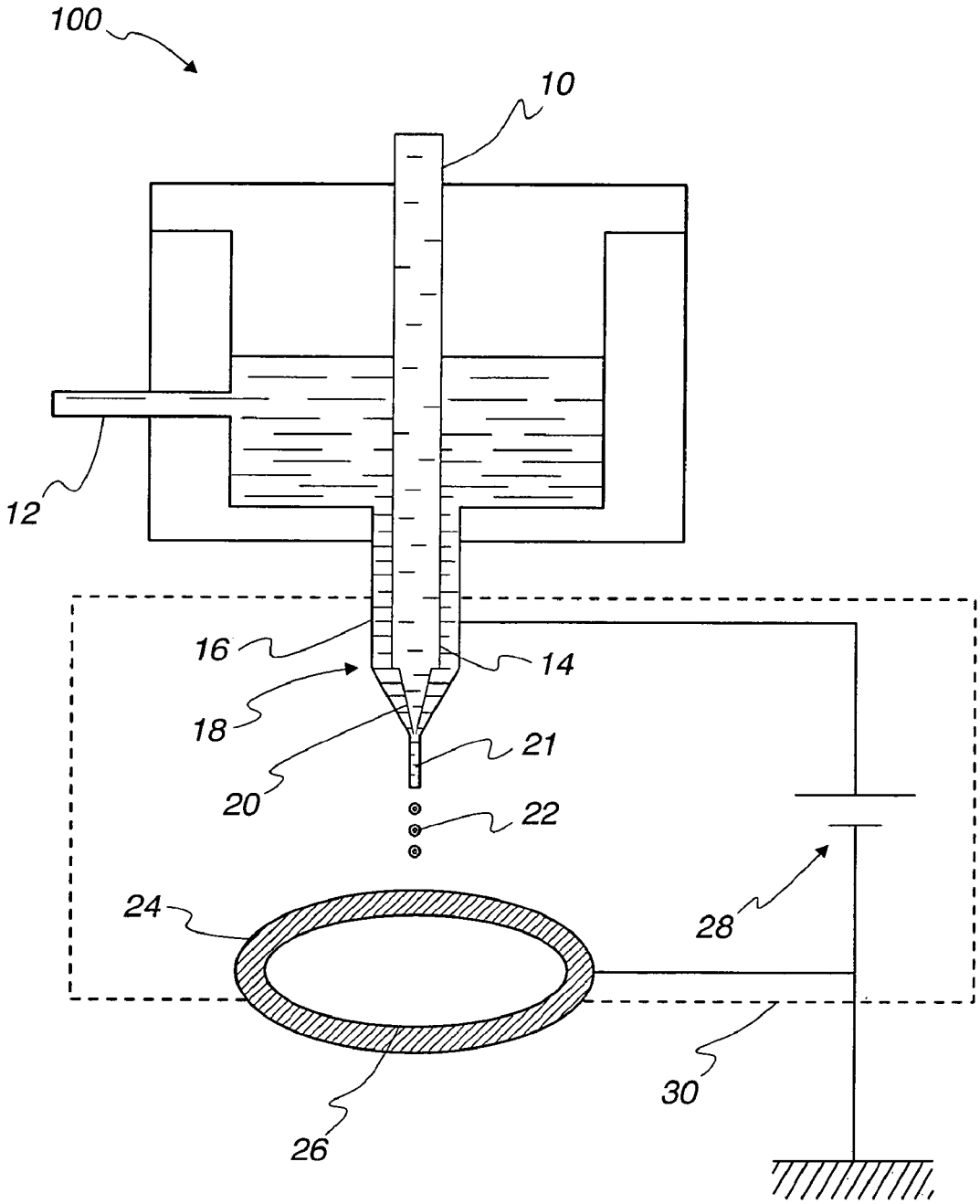
100
10
12
16
14
18
21
20
22
24
28
30
26

PRODUCTION OF CAPSULES AND PARTICLES FOR IMPROVEMENT OF FOOD PRODUCTS

Matter enclosed in heavy brackets [ ] appears in the original patent but forms no part of this reissue specification; matter printed in italics indicates the additions made by reissue.

*This application is a reissue application of U.S. Pat. No. 6,989,169, filed as application Ser. No. 10/627,387 on Jul. 25, 2003, which is a continuation of application No. PCT/US02/02787, filed Jan. 30, 2002, which claimed the benefit of ES 200100231, filed Jan. 31, 2001.*

This application is a continuation of PCT Application No. US 02/02787, filed on Jan. 30, 2002, entitled "Production of Capsules and Particles for Improvement of Food Products," which claims priority from Spanish Patent No. 200100231, filed on Jan. 31, 2001.

FIELD OF INVENTION

The invention relates generally to the field of production of small particle and/or capsules with extremely small and uniform sizes using electro hydrodynamic (EHD) techniques. The particles and/or capsules as prepared by this invention are especially adapted for use in food products and allow, for example, the addition of enhancing or functional food additives without adversely effecting the organoleptic or other properties of the food products.

BACKGROUND OF THE INVENTION

The present invention uses electro hydrodynamic (EHD) forces to generate coaxial jets and to stretch them out to the desired sizes. For appropriate operating conditions, a liquid flow rate, in the form of a micro/nanometric-sized jet, is issued from the vertex of a Taylor cone (i.e., a liquid meniscus which adopts a conical shape due to the balance between the electric stresses and the interfacial tension). For appropriate operating conditions, a liquid flow rate, in the form of a micro/nanometric jet, is issued from the vertex of such a Taylor cone. The break up of this jet gives rise to an aerosol of charged droplets, which is called electrospray. This configuration is widely known as electrospray in the cone-jet mode (Cloupeau et al., J. Electrostatics, 22, 135-159, 1992). The scaling laws for the emitted current and the droplet size of the electrospray are given in the literature (see, e.g., Fernández de la Mora et al., J. Fluid Mech., 260, 155-184, 1994; Gañán-Calvo et al., J. Aerosol Sci., 28, 249-275, 1997; Gañán-Calvo, Phys. Rev. Lett., 79, 217-220, 1997; Hartman et al., J. Aerosol Sci., 30, 823-849, 1999). Electrospray is a technique which has satisfactory proved its ability to generate steady liquid jets and monodisperse aerosols with sizes ranging from a few of nanometers to hundred of microns (Loscertales et al., J. Chem. Phys., 103, 5041-5060,1995). Generally, in most electrospray experiments, a unique liquid (or solution) forms the Taylor cone. However, the procedure described in the U.S. Pat. No. 5,122,670 (Jun. 16, 1992) and U.S. Pat. No. 5,517,260 (Oct. 20, 1992), entitled "Multilayer Flow Electrospray Ion Source Using Improved Sheath Liquid" and "Method and Apparatus for Focusing Ions in Viscous Flow Jet Expansion Region of an Electrospray Apparatus," respectively, involve two or more miscible liquids which were properly injected to be mixed in the Taylor cone to improve the transmission of ions, and the stability and sensitivity of a mass spectrometer. Other patents of interest to the present invention relating to electrospray technology include, for example, U.S. Pat. No. 4,885,076 (Dec. 5, 1989), U.S. Pat. No. 4,977,785 (Dec. 18, 1990), U.S. Pat. No. 5,170,053 (Dec. 8, 1992), U.S. Pat. No. 5,171,990 (Dec. 15, 1992), U.S. Pat. No. 5,393,975 (Feb. 28, 1995), and Re. 35,413 (Dec. 31, 1996).

Recently there has been significant interest in providing food products having increased health and/or nutritional benefits. Such improved food products and/or such functional foods generally have one or more added ingredients which are included to provide a specific health and/or nutritional benefit. Thus, food such as breads with added carbohydrates, cereals with added vitamins and/or minerals, foods in which undesirable components are reduced by the addition of other more desirable components (e.g., replacement of fat with a fat substitute), soy protein-containing foods, fiber-containing foods, protein-enriched foods, omega fatty acid-containing foods, calcium or other mineral or vitamin enriched foods, dietary supplement-containing foods, and the like are becoming increasing popular with a health conscious public. Such improved or functional foods may contribute to overall well being and/or reduce the risk of certain diseases or conditions.

Unfortunately, it is often difficult to incorporate such ingredients in food products without adversely affecting the organoleptic and/or other properties of the food product. Ideally, it desired to provide such an improved or functional food product which has taste, texture, and other organoleptic properties as close to, and perhaps even superior to, the conventional food product without the added ingredients. In many cases, however, such additives provide undesirable flavor, aroma, textural, or similar properties to the foods to which they are added. In some cases, the enhancing additives may even react or complex with other components of the food product (including, for example, other desired enhancing additives) thereby adversely affecting the food product in some manner or making the additives less readily available for absorption and use in the body upon consumption.

Thus, it would be desirable to provide improved and/or functional foods wherein such enhancing additives are contained in a form which prevents or significantly reduces impairment of the organoleptic or other properties of the foods to which they are added. The present invention provides such improved and/or functional foods. For example, the present invention allows for the incorporation of enhancing additives which would, except for the use of the present invention, normally result in taste, aroma, textural, or other organoleptic defects when added to food products. Thus, the present invention allows for the product of improved and/or functional foods without, or with significantly reduced, organoleptic defects normally associated with such enhancing additives; indeed, the improved and/or functional foods of this invention closely mimic the corresponding conventional food without such enhancing additives.

SUMMARY OF THE INVENTION

The present invention is related to the production of capsules or particles of micro and nanometric size, for introduction into food, using stable electrified coaxial jets of two immiscible liquids with diameters in the micro and nanometric range. An aerosol of charged structured droplets forms when the jets dissociate by capillary instabilities. The structured droplets, which are mono-dispersed in size, contain a first liquid (generally the material desired to be added) that is surrounded by a second liquid. Generally the second liquid provides a barrier or protective coating which allows the addition of the first liquid to a food product without adversely affecting the organoleptic or other properties of the food product.

A variety of devices and methods are disclosed which allow for the formation of the stable electrified coaxial microjets. In preferred embodiments, the inner fluid is a liquid which forms a food or food additive, which would be desirable to have in, but which cannot be added to food for some reason (e.g., taste defects or reaction with other components in the food product). A non-toxic outer liquid surrounds the inner one. Coaxial jets break up into structured droplets where the inner fluid (liquid food) is coated with the outer one (liquid carrier coating). The coating provided by the outer liquid prevents either the taste defects or reactive effects of the liquid food from having its undesirable consequences. These embodiments provide spherical particles of liquid food coated with a layer of another non-toxic material (e.g., a polymer that is degraded in the gastrointestinal tract) and may or may not be a food product.

The outer diameter of the coaxial jets can have a diameter in the range of from about 80 nanometers to about 100 microns. The stable jet is maintained by the action of electrical stresses when both liquids are fed at appropriate flow rates. Mono-dispersed aerosols from the invention are characterized by having a high degree of uniformity in particle size. Particles have the same diameter with a deviation in diameter from one particle to another in a range of about ±2 (or less) to about ±10 percent.

This invention provides a method to form stable coaxial electrified jets of two non-miscible liquids via EHD. This invention also provides a mono-disperse aerosol of structured particles or capsules as a result of the break up of the coaxial jets. Capsules are characterized by having the same diameter with a deviation in diameter from one particle to another in a range of from about ±2 (or less) to about ±10 percent. These capsules may be desiccated following dispersion and then added to food.

One advantage of the present invention is that the resulting droplets have an uniform size, and that, depending of the properties of the liquids and the injected flow rates, such a size can be easily varied from tens of microns to a few nanometers. Another advantage of the invention is that capsules are created with a relatively small amount of energy. Another feature of the invention is that the surface area of a given substance can be maintained while decreasing the overall amount of the substance (e.g., a fiber particle coated with oil). This can allow introduction of components that are generally incompatible with a food (e.g., introduction of lactase in milk) by coating the component. Yet another feature of the invention is the use production of time-release components to control delivery of the contents of the capsule (e.g., carbohydrates coated to allow a systematic delivery over, for example, a one to twelve-hour period).

Another advantage of this invention results from the fact that breaking up of the jet gives rise to structured micro/nanometric droplets. In some particular applications, the outer liquid is a solution containing monomers, which under appropriate excitation polymerize to produce micro/nanometric capsules. When uncharged droplets are required, the aerosol can be easily neutralized by corona discharge.

These and other aspects, advantages, and features will become apparent to those skilled in the art upon reading this disclosure in combination with the figure provided.

BRIEF DESCRIPTION OF THE DRAWING

The FIGURE provides a schematic representation of an apparatus 100 suitable for the formation of capsules and particles for incorporation into food products by generation of compound jets via EHD. A structured Taylor cone 20 forms at the ends 18 the electrified needles 14 and 16 when inner liquid 10 and outer liquid 12, respectively, are injected at appropriate flow rates through their respective needle tips 18. At least one needle (in this case needle 16) is connected at a potential difference 28 with respect to a reference electrode 24 which has a hole 26 there through. In one preferred embodiment, the potential difference 28 between the needles 14 and 16 and the reference electrode 24 is a few kV. Two concentric jets 21, one of them surrounding the other, issue from the tip (i.e., cone vertex) of Taylor cone 20. The concentric jets 21 break up eventually by varicose instabilities giving rise to an aerosol of compound drops 22 with the inner liquid 10 (dark grey) surrounded by the outer one 12 (lighter gray). Chamber 30 contains a dielectric atmosphere (i.e., gas, liquid, or vacuum) in which the compound drops 22 are formed. Compound drops 22 can be removed from chamber 30 via hole 26.

DETAILED DESCRIPTION

The present invention is related to the production of capsules or particles of micro and nanometric size, for introduction into food, using stable electrified coaxial jets of two immiscible liquids with diameters in the micro and nanometric range. An aerosol of charged structured droplets forms when the jets dissociate by capillary instabilities. The structured droplets, which are mono-dispersed in size, contain a first liquid (generally the material desired to be added) that is surrounded by a second liquid. Generally the second liquid provides a barrier or protective coating which allows the addition of the first liquid to a food product without adversely affecting the organoleptic or other properties of the food product.

In the present invention, liquids are injected at appropriate flow rates throughout metallic needles connected to a high voltage supply. The needles can be arranged either concentrically or one of them surrounding the others. Moreover, if the electrical conductivity of one or more liquid is sufficiently high, then the liquid can be charged through its bulk. In that case a non-metallic needle (i.e., silica tube) can be used to inject the liquid.

The present invention uses two or more immiscible liquids (or poorly miscible) to form, by means of EHD forces, a structured Taylor cone surrounded/immersed by a dielectric atmosphere (gas, liquid, or vacuum). Preferably the dielectric atmosphere is an inert gas (i.e., non-reactive with at least the outermost liquid) or a vacuum. An outer meniscus surrounding the inner ones forms the structure of the cone. A liquid thread is issued from the vertex of each one of the menisci in such a way that a compound jet of co-flowing liquids is formed. The structured, highly charged micro/nanometric jet issues from the vertex of the Taylor cone, and eventually breaks up to form a spray of structured, highly charged, monodisperse micro/nanometric droplets. The term structured jet as used herein refers to either quasi-cylindrical coaxial jets or a jet surrounding the others. The outer diameter of the jet generally ranges from about 50 microns to a few nanometers. The term spray of structured, highly charged, monodisperse, micro/nanometric droplets as used herein refers to charged droplets formed by concentric layers of different liquids or by an outer droplet of liquid surrounding smaller droplets of immiscible liquids (or emulsions)/a liquid engulfing smaller droplets of immiscible liquids. The outer diameter of the droplets ranges from 100 microns to a few of nanometers.

A variety of devices and methods are disclosed which allow for the formation of the stable electrified coaxial micro-jets. In preferred embodiments, the inner fluid is a liquid which forms a food or food additive, which would be desirable to have in, but which cannot be added to food for some reason (e.g., taste defects or reaction with other components in the food product). A non-toxic outer liquid surrounds the inner one. Coaxial jets break up into structured droplets where the inner fluid (liquid food) is coated with the outer one (liquid carrier coating). The coating provided by the outer liquid prevents either the bad taste or reactive effects of the liquid food from having its undesirable consequences. These embodiments provide spherical particles of liquid food coated with a layer of another non-toxic material (e.g., a polymer that is degraded in the gastrointestinal tract) and may or may not be a food product.

In general, the present invention uses a device having a number N of feeding tips of N liquids, such that a flow rate Qi of the i-th liquid flows through the i-th feeding tip, where i is a value between 2 and N. The feeding tips are arranged concentrically and each feeding tip is connected to an electric potential $V_1$ with respect to a reference electrode. The i-th liquid that flows through the i-th feeding tip is immiscible or poorly miscible with liquids (i+1)-th and (i−1)-th. An electrified capillary structured meniscus with noticeable conical shape forms at the exit of the feeding tips. A steady capillary coaxial jet, formed by the N liquids, such that the i-th liquid surrounds the (i+1)-th liquid, issues from the cone apex. Generally, such capillary jet has a diameter ranging typically from 100 microns and 15 nanometers. This diameter is much smaller than the diameters of the feeding tips of the N liquids.

The feeding tips may also be arranged such that the outer liquid surrounds the rest of the feeding tips. In this case, at the exit of the feeding tips, an electrified capillary meniscus is formed with noticeable conical shape, whose apex issues an steady capillary compound jet formed by the N co-flowing liquids, in such a way that, for example, liquid 1 surrounds the rest of the liquids. The N feeding tips of the device have diameters that may vary between 0.01 mm and 5 mm. The flow rates of the liquids flowing through the feeding tips may vary between about $10^{-17}$ $m^3/s$ and about $10^{-7}$ $m^3/s$. When the distance between the feeding tip and the reference electrode is between about 0.01 mm and about 5 cm, the applied electric potential generally is in the range of about 10 V to about 30 KV.

In the particular case having only two feed tips (i.e., N=2; see the FIGURE), the present invention provides an apparatus comprising:

a) a feeding tip 1 through which liquid 1 flows at a flow rate $Q_1$ to a exit 1 and it is connected to an electric potential $V_1$; and b) a feeding tip 2 through which liquid 2 flows at a flow rate $Q_2$ to an exit 2 and it is connected to an electric potential $V_2$, wherein the feeding tip 2 is surrounded by liquid 1 and such that $V_1$ and $V_2$ are differential values with respect to an electrode connected to a reference potential, whereby an electrified capillary meniscus with noticeable conical shape is formed at the exit of the feeding tips 1 and 2, whereby a steady capillary jet is formed by liquids 1 and 2, such that liquid 1 completely surrounds liquid 2 as they issue from the exits 1 and 2, wherein liquids 1 and 2 are immiscible or poorly miscible. Generally such a capillary jet has a diameter of about 100 microns to about 15 nanometers; this diameter is smaller than the characteristic diameter of the electrified capillary liquid meniscus from which it is emitted.

Two basic configurations are discussed above that allow setting up a flow of two immiscible liquids that, by the unique action of the electro hydrodynamic (EHD) forces, results in the formation of a steady, structured, micro/nanometric sized capillary jet. This structured micro/nanometric sized capillary jet is immersed in a dielectric atmosphere (immiscible with the outermost liquid forming the jet) that might be a gas, liquid, or vacuum.

The basic device used in both configurations of the above described apparatus comprises: (1) a means-to feed a first liquid 1 through a metallic tube $T_1$, whose inner diameter ranges approximately between 1 and 0.4 mm, respectively; (2) a means to feed a second liquid 2, immiscible with liquid 1, through a metallic tube $T_2$, whose outer diameter is smaller than the inner diameter of $T_1$. In this case, $T_1$ and $T_2$ are concentric (the end of the tubes does not need to be located at the same axial position); (3) a reference electrode (e.g., a metallic annulus for instance) placed in front of the needle exits at a distance between about 0.01 and about 50 mm; the axis of the hole of the annulus is aligned with the axis of $T_1$; and (4) a high voltage power supply, with one pole connected to $T_1$ and the other pole connected to the reference electrode. $T_1$ and $T_2$ might not be connected to the same electric potential. All the elements are immersed in a dielectric atmosphere that might be a gas, a liquid immiscible with liquid 1, or vacuum. Generally the dielectric atmosphere will be contained within a chamber as shown in the FIGURE. Of course, if the dielectric atmosphere is air, the chamber is simply the air surround the Taylor cone and concentric jets. A part of the generated aerosol, or even the structured jet, may be extracted through the orifice in (3) to characterize it or to process it.

The EHD forces must act, at least, on one of the two liquids, although they may act on both. We term driver liquid the one upon which the EHD forces act to form the Taylor cone. In the first configuration, the driver liquid flows through the annular space left between $T_1$ and $T_2$, whereas in the second configuration the driver liquid flows through $T_2$, and the second liquid flows through the annular gap between $T_1$ and $T_2$. In any case, the electrical conductivity of the driver liquid must have a value sufficiently high to allow the formation of the Taylor cone.

Referring to the first configuration, when liquid 1 (the driver liquid) is injected at an appropriate flow rate $Q_1$ and an appropriate value of the electric potential difference is applied between $T_1$ and an electrode and, liquid 1 develops a Taylor cone, whose apex issues a steady charged micro/nanometric jet (steady cone-jet mode). The characteristic conical shape of the liquid meniscus is due to a balance between the surface tension and the electric forces acting simultaneously and/at the meniscus surface. The liquid motion is caused by the electric tangential stress acting on the meniscus surface, pulling the liquid towards the tip of the Taylor cone. At some point, the mechanical equilibrium just described fails, so that the meniscus surface changes from conical to cylindrical. The reasons behind the equilibrium failure might be due, depending on the operation regime, to the kinetic energy of the liquid or to the finite value of the liquid electrical conductivity. The liquid thus ejected due to the EHD force, should be continuously made up for an appropriate injection of liquid through $T_1$ in order to achieve a steady state. The stability of this precursor state may well be characterized by monitoring the electric current/transported by the jet and the aerosol collected at the electrode. Depending on the properties of liquid 1 and on $Q_1$, the liquid motion inside the Taylor cone may be dominated by viscosity, in which case, the liquid velocity everywhere inside the cone is mainly pointing towards the cone tip. Otherwise, the flow inside the cone may exhibit strong re-circulations, which should be avoided to produce structured micro/nanometric jets. Provided the flow is dominated by viscosity, one may then proceed to form the structured micro/nanometric jet. To do that, one continuously supplies liquid 2 through $T_2$. The meniscus of liquid 2, which develops inside the Taylor cone formed by liquid 1, is sucked towards the cone tip by the motion of liquid 1. Under certain operation conditions, which depend on the properties of both liquids (and on the liquid-liquid properties), the meniscus of liquid 2 may develop a conical tip from which a micro/nanometric jet is extracted by the motion of liquid 1. In this situation, there may exist regimes where the jet of liquid 2 flows coaxially with liquid 1. As before, liquid 2 is continuously supplied to $T_2$ at a flow rate $Q_2$ in order to achieve a steady state.

When the device operates in the second configuration, the procedure is analogous, except that the motion of the driver liquid does not need to be dominated by viscosity.

Although not wishing to be limited by theory, the present study suggests that formation of coaxial liquid jets requires that the values of the surface tension of the different fluid pairs appearing in the problem satisfy the inequality $S_{ai}-S_{ao}>S_{oi}$, where $S_{ai}$ is the surface tension of liquid 2 and the dielectric atmosphere, $S_{ao}$ is the surface tension of liquid 1 and the dielectric atmosphere, and $S_{oi}$ is the interfacial tension of liquid 1-liquid 2, respectively.

To give an idea of the typical values of the different parameters appearing in the process, the table below provides experimental measurements of the electric current transported by the jet for different flow rates of the inner liquid keeping fixed the flow rate of the outer liquid.

| $Q_1$ = 50 ml/min | | | | | | |
|---|---|---|---|---|---|---|
| $Q_2$ (ml/min.) | 0.67 | 0.83 | 1.17 | 1.50 | 1.84 | 2.17 |
| I (mAmp.) | 1.1 | 1.3 | 1.5 | 1.7 | 1.9 | 2.0 |

Notice that in this example, corresponding to the case where $Q_1$ is much larger than $Q_2$, the value of the current I follows the well-known electrospray law $I \mu Q_2^{1/2}$.

To produce nanometric capsules through the procedure of the present invention a photopolymer may be used as the external liquid. Indeed, the break up of the structured jet by the action of capillary instabilities gives place to the formation of an aerosol of structured droplets which, under the action of a source of ultraviolet light, allows encapsulation of the inner liquid.

General Device Illustrated in the FIGURE. A device 100 used to produce stable charged coaxial jets of non-miscible liquids with diameters in the micro/nanometric range and the subsequent aerosol of structured micro/nano particles or capsules for addition to food is shown and described herein (see the FIGURE). Of course, other embodiments of this device can be used so long as they produce the desired aerosol of structured micro/nano particles or capsules for addition to food. Although various embodiments are part of the invention, they are merely provided as exemplary devices which can be used to convey the essence of the invention, which is the formation of stable coaxial micro jets of micro and nanometric diameters via EHD and/or uniform dispersion of charged structured micro/nano particles.

The basic device for using in the invention according to the FIGURE comprises: (1) a means for supplying a first liquid 12 through a metallic tube 16, preferably with an OD of about 400 mm and ID of about 200 mm; (2) a means for supplying a second liquid 10, non-miscible with the first liquid 12, through a metallic tube 14, with an OD that is smaller than the ID of tube 16; (3) a counter electrode (ground) 24, or extractor, like a metallic plate, placed a short distance (e.g., preferably about 1 mm) in front of the needle tips 18, having a hole 26 therein; the center of the hole 26 is approximately located along, and aligned, with, the long axis of the needle tips; and (4) a high voltage power supply, with one of the poles connected to needle 16 and the other one connected to the counter electrode 24. Both needles or tubes 14 and 16 may or may not be at the same electrical potential. In the configuration shown in the FIGURE, needle 14 is placed concentrically inside of needle 16. The exit of the needle or tubes 14 and 16 may or may not be located at the same axial position. All the components are immersed in a dielectric atmosphere that may be a gas, liquid, or vacuum. A Tayor cone 20 forms at needle tips 18 and a micro structured jet 21 forms from the portion of the Taylor cone 20 removed from the needle tips 18. Part of the aerosol 22 formed, or even the micro structured jet 21, may be withdrawn through the hole 26 for further processing or characterization of the products. Of course, as those skilled in the art will realize, specific dimensions given here, as well as through out the specification, can be varied so long as the desired capsules and particles for incorporation into food products can be obtained as described herein.

More specifically, the FIGURE provides a schematic representation of an apparatus 100 suitable for the formation of capsules and particles for incorporation into food products by generation of compound jets via EHD. A structured Taylor cone 20 forms at the ends 18 of the electrified needles 14 and 16 when inner liquid 10 and outer liquid 12, respectively, are injected at appropriate flow rates through their respective needle tips 18. At least one needle (in this case needle 16) is connected at a potential difference 28 with respect to a reference electrode 24 which has a hole 26 there through. In one preferred embodiment, the potential difference 28 between the needles 14 and 16 and the reference electrode 24 is a few kV. Two concentric jets 21, one of them surrounding the other, issue from the tip (i.e., cone vertex) of Taylor cone 20. The concentric jets 21 break up eventually by varicose instabilities giving rise to an aerosol of compound drops 22 with the inner liquid 10 (dark grey) surrounded by the outer one 12 (lighter gray). Chamber 30 contains a dielectric atmosphere (i.e., gas, liquid, or vacuum) in which the compound drops 22 are formed. Compound drops 22 can be removed from chamber 30 via hole 26.

If the electrical conductivity of one of the two liquids is high enough, a conical meniscus (Taylor cone) is formed at the exit of the needle when a sufficiently high voltage difference is applied between the needle 16 and counter electrode 24. We shall call driving liquid the one upon which the EHD forces act to form the Taylor cone. It is necessary that EHD forces act on one liquid at least, although they may act on both. We shall describe the configuration in which the "driving" liquid flows through the gap left between needles 14 and 16. A very thin (micro/nano) jet 21 issues from the Taylor cone 20 (i.e., the cone vertex), the so-called cone-jet mode. The conical shape of the meniscus is due to the balance between surface tension and electric forces acting on the meniscus surface. The motion of the liquid is ignited by the electric shear stresses acting on the cone's surface, which pulls the liquid towards the cone's tip. Other forces like dynamical pressure becomes important at and beyond certain point of the conical interface of the electrified meniscus, and the interface changes from conical to a jet-like shape. The liquid mass ejected through the jet by EHD forces, should continuously be make up by an appropriate continuous supply of liquid 12 through needle 16 to achieve a steady state; let this flow rate be $Q_A$. The stability of this precursor stage depends through the current/carried by the jet and the aerosol that is collected at 24. Depending on both the properties of fluid 12 and on $Q_A$, the movement of liquid 12 inside the Taylor cone may be fully dominated by viscosity. In that case, the fluid velocity, anywhere inside the Taylor cone, is dominantly pointing towards the cone apex. Otherwise, the flow may exhibit strong re-circulatory meridian motion and even swirl. These motions should be avoided in order to produce coaxial jets via EHD. If the flow of liquid 12 is dominated by viscosity, and a flow rate $Q_B$ of liquid 10 is continuously supplied to needle 14, the meniscus of liquid 10, formed inside the Taylor cone 20 developed by liquid 12, is pulled by the motion of liquid 12 towards the cone's apex. Under certain operation conditions, which depend on the properties and the flow rates of both liquids, the meniscus of liquid 10 develops a conical tip from which a steady micro/nano jet of liquid is pulled by the motion of liquid 12. In this situation, there might be regimes in which both jets flow concentrically, that of liquid 10 being inside that of liquid 12. Again, to reach a steady state, liquid 12 should continuously be supplied to needle 14 at a certain flow rate $Q_B$. The other configuration is performed when the "driving" liquid 12 flows through needle 16 and the second liquid 10 flows trough the annular gap between 14 and 16. In this case, the motion of the "driving" liquid does not need to be dominated by viscosity.

Liquid 10 (i.e., the inner liquid in the desired capsules or particles) is in general a liquid formulation of a food, which is high in nutritional value but has an unpleasant taste and therefore it would be of interest to coat it with a polymer or any other material with no taste.

The focusing effect of the electrical forces gives rise to jets with diameters which can be thousand of times smaller in diameter than the diameters of the needles. This effect provides advantages such as (1) clogging of the exit needle is practically eliminated, and (2) the diameters of the coaxial jets and consequently the resulting particles are much smaller than the diameters of the needles. This is desirable since it is very difficult to engineer holes or tubes for liquid extrusion with very small diameters.

A variety of configurations of components and types of fluids will become apparent to those skilled in the art upon reading this disclosure. These configurations and fluids are encompassed by the present invention provided they can produce a stable electrified cone-jet mode of a first liquid. The liquid coming from a feeding needle forms a Taylor cone 20 at the exit port if the needle is connected to an electrical potential whose value lies within of an appropriate range with respect to a reference electrode. A very thin electrified jet 21 is emitted from the cone vertex. A second fluid, non-miscible with the first one, can be injected at appropriate flow rates through a second needle, which is concentrically configured with respect the first one. This second needle can be connected to the same, or alternatively to a different, potential. A jet is issued from the tip of the more or less conical meniscus of the second fluid, which is anchored at the exit of the second needle. This jet is accelerated by the first one through the action of the viscous forces and flows coaxially it. The eventual break up of the coaxial jets due to varicose instabilities results in an aerosol 22 of spherical droplets with an inner liquid coated by an outer one. The stability of the droplets can be maintained by a number of procedures. For example, they can be aspirated into a curing tube and irradiated by energy to harden or polymerize the outer coating. As an example, lactose could be coated with a polymer coating, which would not dissolve in a dairy product (e g , milk or ice cream) but would dissolve in the gastrointestinal tract. It would make possible that lactase intolerant individuals eat dairy products since lactose would combine with the lactase enzyme after being consumed and its negative effect for those individuals becomes neutralized.

The embodiment of the FIGURE is clearly designed to produce capsules of one substance coated by another substance. Therefore, the outer feeding needle is positioned concentrically with the inner one in the device in the FIGURE. Furthermore, two or more additional feeding needles with each one concentrically positioned around the preceding one may surround the inner needle. If several liquids are injected through the needles at appropriate flow rates and values of the needle voltage, the break up of the resulting coaxial multi-jets gives rise to an aerosol of droplets composed of several approximately concentric layers. The diameters of the spheres (inner and outer) can be precisely adjusted by varying the outer-inner flow rate ratio.

It should be emphasized that the diameters of the coaxial jets depend on: (1) the flow rates, (2) the properties of the two liquids, mainly on the conductivity of the driving liquid, and (3) the applied voltages, but not from the diameters of the feeding needles. The former can be thousand of times smaller than the latter ones.

In the case of capsules of two materials, the material that will constitute the nucleus of the capsule is steadily injected through the inner needle while the coating is injected between the inner and the outer tubes. One of the liquids (or both) acts as driver forming a Taylor cone under the action of the EHD forces from whose vertex an extremely thin jet is emitted. The other liquid is forced by viscous forces as a consequence of the motion of the driving liquid (or by a combination of both viscous and EHD forces if the electrical conductivity of the second liquid is also sufficiently high).

Formulation and composition of particles prepared using the present invention in food products. In the present specification and appended claims, the singular forms a, and, and the include plural referents unless the context clearly dictates otherwise. Thus, for example, reference to a capsule includes a plurality of capsules and reference to a liquid includes reference to a mixture of liquids, and equivalents thereof known to those skilled in the art, and so forth. Unless defined otherwise, all technical and scientific terms used herein have the same meaning as commonly understood by one of ordinary skill in the art to which this invention belongs.

The terms capsules, atomized particles, and atomized particles of formulation are used interchangeably herein and shall mean particles of liquid formulations (preferably liquid food) that have been atomized using the device and method of the invention.

The term formulation as used herein refers to any matter to be atomized. A formulation may contain a single component to be added to the food, or may contain multiple components. The term is also intended to encompass excipients, carriers, and the like, including compounds to which components are conjugated, as described in the following sections.

The term food as used herein means (1) articles used for food (consumed by mouth for nutrition) or drink for man or other animals, (2) articles used for components of any other such food article. Food includes articles used by people in the ordinary way most people use food (i.e., for taste, aroma, and/or nutritive value). The term food as used herein is also intended to cover food additives (e.g., condiments) and specialized foods such as infant formula.

The term food additive as used herein means any substance the intended use of which results or may reasonably be expected to result, directly or indirectly, in its becoming a component or otherwise affecting the characteristics of any food, including any substance intended for use in producing, manufacturing, packing, processing, preparing, treating, packaging, transporting, or holding food. The term as used herein does not include a pesticide chemical or a drug regulated by the Food and Drug Administration (as either a prescription or over the counter (OTC) drug) that has been added to the food. Examples of food additives include components which by themselves are not additives such as vitamins, minerals, color additives, herbal additives (e.g., Echinacea, St. John's Wort, and the like), antimicrobials, preservatives, and the like which when added to food are additives.

The term color additive as used herein includes a dye, pigment, or other substance that when added or applied to a food is capable of imparting color thereto.

The term infant formula as used herein refers to a food which purports to be or is represented for special dietary use solely as a food for infants by reason of its simulation of human milk or its suitability as a complete or partial substitute for human milk.

The term improved food as used herein refers to a food product that is improved over a conventional food product by the addition of more of a component already present in the conventional counterpart. As used, the term encompasses functional foods, but also includes food such as breads with added carbohydrates, cereals with added vitamins and/or minerals, and foods in which undesirable components are reduced by the addition of other more desirable components (e.g., replacement of fat with a fat substitute).

The term functional food as used herein refers to designed food with functional additives that effectively combine ingredients not usually found together in a single food source. Functional foods have the appearance and structure of conventional foods but contain significant levels of biologically active components that impart health benefits or desirable physiological effects beyond basic nutrition. An example of functional food is a food that is not normally high in fiber or protein to which either fiber or protein is added. For example, the addition of insoluble fiber whose source is wheat bran to some foods may reduce the risk of breast or colon cancer.

The term nutriceutical as used herein refers to products produced from foods and/or natural sources (e.g., herbal extracts) that are sold in medical forms such as pills, powders and potions.

The terms vitamins, minerals, vitamin and minerals, and the like as used herein generally refer to nutritive food additives that may be found in or added to a food product. As used herein, vitamins supplements and mineral supplements are considered dietary supplements, and as they are separate products they do not fall under the definition of food per se, but rather are considered to be nutriceuticals for purposes of the present application.

The term drug as used herein means (1) articles recognized in the official United States Pharmacopoeia, official Homeopathic Pharmacopoeia of the United States, official National Formulary, or the Physician's Desk Reference (PDR), any supplement to any of them; and (2) articles intended for use in the diagnosis, cure, mitigation, treatment, or prevention of disease in man or other animals; and (3) articles (other than food) intended to affect the structure or any function of the body of man or other animals; and (4) articles intended for use as a component of any articles specified in (1), (2), or (3).

The methods described herein allow for the addition to food of a number of different components but avoiding the contact between food and additives. The functional components may be used alone or in combination in the particles, which can be designed and sized for increased bio-efficiency of the particles. Moreover, functional components may be found in the interior of the coated particle, as a layer in multilayered particles, or in the coating of particles produced in this invention.

Formulation components may also be inert materials that serve to coat a functional particle, or provided a filler as a template to be coated with composition containing a functional particle.

For example, herbal extracts and/or the functional components of such may be added to foods, including beverages, chewing gums, and sports bars using the present invention. Functional components like phyto-chemicals and/or other functional components that provide physiological benefits can be incorporated to food to bring these benefits to consumers. Some examples are sitostanol ester or other bioactive ingredients such as omega-3-fatty acid and bifidogenic dietary fibers which can help to lower cholesterol and to fight cardiovascular disease. Carotenoids, collagen hydrolysate, flavonoids among others functional components are additional examples.

Exemplary uses of the present invention. The present invention provides a method of coating one formulation with another formulation to form capsules with diameters in the micro and nanometric range to be added to food. The method is especially adapted for the introduction of a number of components to food products, including multilayered functional components as described below. The method of the invention can be used to coat functional components with a substance having a desirable quality for food flavor or texture (e.g., spices, seasonings, natural flavorings, and the like). Thus, the present invention allows the incorporation of an effective amount of an enhancing or functional additive to a food product without adversely effecting the organoleptic properties of the food product. An "effective amount" is an amount of additive which provides the desired effect or benefit upon consumption.

The method of the invention can be used to produce food products having greater fiber content, while still maintaining the texture and taste of their conventional counterparts, by coating fiber particles with a desirable substance that enhances the flavor, texture, etc, of the food. For example, bran particles can be coated with another substance (e.g., fat, oil or sugar), and to mimic the normal size of particles size in food (e.g., fat-coated bran particles can be produced to mimic the normal size of fat globules in foods). This will preserve the flavor and/or feel of the food, and it may be helpful in creating foods that are lower in fat, to decrease cardiovascular disease, or lower in sugar, for diabetics, without sacrificing the taste or texture of the food product.

The device can be also used to coat proteins and/or specific amino acids in food to make them higher in proteins and/or desired amino acids, but with better taste and/or texture due to the substance that is coating the protein. Coating of other filler molecules, such as methylcellulose, casein, and the like, is also intended to be encompassed in the present invention. The use of such filler compositions, which preferably do not add to the caloric nature of a food will be apparent to one skilled in the art upon reading the present disclosure.

Foods with components having food additives coatings. As long as the effectiveness of a food additive is due to its surface area, the use of the method of the invention may substantially reduce the amount of additives. For example, coating a filler particle without altering the color of a food or drink may reduce the amount of color additives that are added to food products.

Food additives that may be used to coat a particle include, but are not limited to, acidifiers, adjuvant of flavor, flavor enhancers among many others.

Foods with incompatible components. Foods having functional components that are incompatible with the other ingredients of the food product may also be coated using the method of the present invention. For example, the addition of coated particles of lactase, which would be released in the gastrointestinal tract, to a dairy product such as milk, cheese, or ice cream would permit people affected with lactose intolerance to digest these products. The addition of coated amylase particles can also facilitate the digestion of certain high-fiber foods.

Other components that when added to a food may cause the food to change in nature of texture can also be added to a food by coating the particle for release during digestion. The addition of gelatin to a beverage, which can be healthy for bones and joints, changes the nature of the beverage at least gelatin is coated with the method of the present invention and after added to the beverage.

Foods fortified with components that alter taste. Minerals such iron compounds can alter the taste of a food product but a coating that has either a neutral flavor or a flavor that enhances the food product can mask this effect. Omega-3 fatty acids and garlic extract, which have been touted to lower cholesterol and triglyceride levels in the blood, can be coated to eliminate their negative influence on the flavor of the food and to allow them to be added to a wide variety of foods.

The present invention is not limited to the particular components and steps described above, as these may, of course, vary. It is also to be understood that the terminology used herein is for the purpose of describing particular embodiments only and is not intended to be limiting, since the scope of the present invention will be limited only by th appended claims. All publications, including patents, referred to in the present specification are hereby incorporated by reference.

What is claimed is:

1. A method for producing encapsulated particles to be added to food products, said method comprising:

forcing a first liquid through a first exit opening in an electrified first feeding needle to form a Taylor cone at the first exit whereby an extremely thin jet of the first liquid is emitted into a chamber having gas or vacuum;

forcing a second liquid, non-miscible with the first liquid, through a second exit in a second feeding needle, wherein the second feeding needle is concentrically located with respect to the first feeding needle, in a manner which causes the second liquid to form a conical meniscus which is anchored at the second exit of the second feeding needle and surrounds the Taylor cone of the first liquid;

wherein a jet of the second liquid, which is coaxial with, and surrounds, the extremely thin jet of the first liquid, is issued from the conical meniscus into the chamber;

wherein the second feeding needle is at the same or different electrical potential than the first feeding needle;

wherein the chamber contains a dielectric atmosphere;

wherein stable fluid interfaces are maintained between the second liquid and the gas or vacuum in the chamber and wherein the second and first liquids forced from the first and second feeding needles form the encapsulated particles; and wherein the encapsulated particles comprise an inner core of the first liquid and an outer layer of the second liquid and wherein the encapsulated particles have an average diameter of about 100 microns to about 15 nanometers.

2. The method of claim 1, wherein the second liquid forms a Taylor cone and first liquid is driven by the second liquid.

3. The method of claim 1, wherein the first liquid is a food or food additive and the second liquid is a polymer material which encapsulates the food or food additive.

4. The method of claim 2, wherein the first liquid is food or food additive and the second liquid is a polymer material which encapsulates the food or food additive.

5. The method of claim 1, wherein the first liquid is a food or food additive with high nutritional value but offensive taste and the second liquid is a polymer which encapsulates the food or food additive.

6. The method of claim 2, wherein the first liquid is food or food additive with high nutritional value but offensive taste and the second liquid is a polymer which encapsulates the food or food additive.

* * * * *